(12) United States Patent
Kongo

(10) Patent No.: US 11,268,226 B2
(45) Date of Patent: Mar. 8, 2022

(54) SEWING DATA PROCESSING SYSTEM, TERMINAL, SEWING MACHINE, AND PROGRAM

(71) Applicant: JANOME SEWING MACHINE CO., LTD., Hachioji (JP)

(72) Inventor: Takeshi Kongo, Hachioji (JP)

(73) Assignee: JANOME SEWING MACHINE CO., LTD., Tokyo (JP)

( * ) Notice: Subject to any disclaimer, the term of this patent is extended or adjusted under 35 U.S.C. 154(b) by 47 days.

(21) Appl. No.: 16/454,057

(22) Filed: Jun. 27, 2019

(65) Prior Publication Data

US 2020/0109503 A1 Apr. 9, 2020

(30) Foreign Application Priority Data

Oct. 9, 2018 (JP) .............................. JP2018-190917

(51) Int. Cl.
*D05C 5/02* (2006.01)
*D05B 19/08* (2006.01)
*G05B 19/042* (2006.01)
*D05C 5/04* (2006.01)
*D05B 19/10* (2006.01)

(52) U.S. Cl.
CPC ............... *D05C 5/02* (2013.01); *D05B 19/08* (2013.01); *D05B 19/10* (2013.01); *D05C 5/04* (2013.01); *G05B 19/042* (2013.01); *D05D 2205/085* (2013.01); *G05B 2219/2626* (2013.01)

(58) Field of Classification Search
None
See application file for complete search history.

(56) References Cited

U.S. PATENT DOCUMENTS

| | | | | |
|---|---|---|---|---|
| 4,104,976 A | * | 8/1978 | Landau, Jr ........... | G05B 19/102 112/275 |
| 5,034,897 A | * | 7/1991 | Sainen ................... | G05B 13/02 700/140 |
| 5,267,169 A | * | 11/1993 | Yokoe ................... | D05B 19/08 112/102.5 |
| 5,383,413 A | * | 1/1995 | Hayashi ................ | D05B 19/10 112/102.5 |
| 5,748,843 A | * | 5/1998 | Peck ..................... | D05B 19/02 112/277 |

(Continued)

FOREIGN PATENT DOCUMENTS

JP 2012-135541 A 7/2012

*Primary Examiner* — Khoa D Huynh
*Assistant Examiner* — Grace Huang
(74) *Attorney, Agent, or Firm* — Yokoi & Co., U.S.A.; Toshiyuki Yokoi

(57) ABSTRACT

A terminal has: a sewing information file preparation unit for preparing a sewing information file which includes a sewing information related to a particular sewing data selected from a plurality of sewing data stored in a predetermined folder of a storage unit; and a storage processing unit for storing the prepared sewing information file in another folder of the storage unit. A sewing machine includes: a reading folder determination unit for determining a folder to which the sewing information file to be sewn is read from the storage unit based on the current operation mode; and a sewing data acquisition unit for referring to the sewing information included in the sewing information file from the determined folder and acquiring the particular sewing data.

5 Claims, 10 Drawing Sheets

(56) References Cited

U.S. PATENT DOCUMENTS

| | | | | |
|---|---|---|---|---|
| 5,911,181 A * | 6/1999 | Muto | D05B 19/08 | 112/102.5 |
| 5,924,374 A * | 7/1999 | Mori | D05B 19/105 | 112/102.5 |
| 6,173,665 B1 * | 1/2001 | Sekine | D05B 19/06 | 112/102.5 |
| 6,209,467 B1 * | 4/2001 | Tomita | D05B 19/06 | 112/102.5 |
| 6,227,128 B1 * | 5/2001 | Tomita | D05B 19/105 | 112/102.5 |
| 6,408,775 B2 * | 6/2002 | Hartwig | D05B 19/006 | 112/445 |
| 6,502,006 B1 * | 12/2002 | Laufer | D05B 19/085 | 112/102.5 |
| 6,739,273 B2 * | 5/2004 | Orii | D05B 19/08 | 112/102.5 |
| 7,203,566 B2 * | 4/2007 | Terai | D04B 37/02 | 66/232 |
| 7,280,886 B2 * | 10/2007 | Iida | D05B 19/12 | 700/136 |
| 7,386,361 B2 * | 6/2008 | Nobuyuki | D05B 19/10 | 112/470.04 |
| 7,920,939 B2 * | 4/2011 | Goldman | G06T 11/60 | 700/138 |
| 8,175,741 B2 * | 5/2012 | Ko | D04H 1/4374 | 700/132 |
| 8,596,210 B2 * | 12/2013 | Tokura | D05B 19/16 | 112/470.06 |
| 8,813,664 B2 * | 8/2014 | Sekine | D05B 19/10 | 112/102.5 |
| 10,057,447 B2 * | 8/2018 | Okuno | H04N 1/04 | |
| 10,344,411 B2 * | 7/2019 | Maki | D05B 19/02 | |
| 10,731,280 B2 * | 8/2020 | Kamihira | G06T 1/0007 | |
| 10,767,291 B2 * | 9/2020 | Wilson | G05B 19/408 | |
| 10,889,928 B2 * | 1/2021 | Fujimoto | G05B 19/4183 | |
| 11,118,291 B2 * | 9/2021 | Kongo | D05B 19/006 | |
| 2005/0149213 A1 * | 7/2005 | Guzak | G06F 9/451 | 700/94 |
| 2010/0281178 A1 * | 11/2010 | Sullivan | H04N 21/2665 | 709/231 |
| 2012/0165970 A1 * | 6/2012 | Tashiro | D05C 5/04 | 700/138 |
| 2013/0321168 A1 * | 12/2013 | Mahony | A61B 5/002 | 340/870.09 |
| 2015/0128837 A1 * | 5/2015 | Okuyama | D05B 19/10 | 112/470.04 |
| 2016/0069007 A1 * | 3/2016 | Kongo | D05B 19/06 | 700/138 |
| 2019/0136428 A1 * | 5/2019 | Son | D05B 19/12 | |
| 2019/0203393 A1 * | 7/2019 | Kongo | D05B 19/08 | |
| 2021/0196977 A1 * | 7/2021 | Zhang | A61N 5/0616 | |

* cited by examiner

Fig. 6

```
<?xml version="1.0" encoding="shift-Jis"?>
<embroidery>
    <design>
        <note>Flower and text</note>
        <path>¥EMB¥MyDesign¥Flower¥Lily</path>
        <name>Design100.jef</name>
    </design>

<design>
        <note>(Important) Saved after embroidery</note>
        <path>¥EMB¥MyDesign¥Sports</path>
        <name>Picher.jef</name>
        <command>
            <instruction>TRANSFER</instruction>
            <option>¥EMB¥Reserved</path>
        </command>
    </design>

......

</embroidery>
```

SEWING DATA PROCESSING SYSTEM, TERMINAL, SEWING MACHINE, AND PROGRAM

CROSS-REFERENCES TO RELATED APPLICATIONS

This patent specification is based on Japanese patent application, No. 2018-190917 filed on Oct. 9, 2018 in the Japan Patent Office, the entire contents of which are incorporated by reference herein.

BACKGROUND OF THE INVENTION

1. Field of the Invention

The present invention relates to a sewing data processing system, a terminal, a sewing machine and a program.

2. Description of the Related Art

In a sewing machine dealing with an embroidery data, the embroidery data or the like is prepared by using a personal computer (PC), a tablet terminal or the like, the embroidery data or the like is provided on the sewing machine via a recording medium or the like, and a sewing is executed according to the embroidery data (e.g., Patent document 1).

In such a case, the embroidery data is stored in a plurality of folders based on a content of the embroidery data.

[Patent document 1] Japanese Unexamined Patent Application Publication No. 2012-135541

BRIEF SUMMARY OF THE INVENTION

Recently, as the capacity of the recording medium increases, a large amount of data can be stored in the recording medium.

Therefore, when storing a large amount of data, the number of storage folders increases and the hierarchy becomes deeper in some cases.

Because of this, when the sewing is executed by using the sewing machine, a large amount of labor is required for finding and sewing the desired sewing data in some cases.

On the other hand, it is possible for a user to store only the necessary sewing data in the recording medium. However, the capacity to be used is a little even though the storage medium having a large capacity is used. Thus, usability problems may occur.

The present invention provides a sewing data processing system, a terminal, a sewing machine and a program that enable the user to easily obtain a desired embroidery data from the hierarchized folders. In addition, unnecessary embroidery data can be automatically deleted.

Embodiment 1: One or more embodiments of the present invention proposes a sewing data processing system, including: a terminal for preparing a plurality of sewing data; a storage unit for storing the plurality of sewing data prepared by the terminal; and a sewing machine for executing a sewing by reading the plurality of sewing data stored in the storage unit, wherein the terminal includes: a sewing information file preparation unit for preparing a sewing information file which includes a sewing information related to a particular sewing data selected from the plurality of sewing data stored in a first folder of the storage unit; and a storage processing unit for storing the prepared sewing information file in a second folder of the storage unit, and the sewing machine includes: a sewing data acquisition unit for referring to the sewing information included in the sewing information file based on an operation mode and acquiring the particular sewing data corresponding to the referred sewing information from the storage unit.

Embodiment 2: One or more embodiments of the present invention proposes the sewing data processing system, wherein the sewing information includes a path information of the second folder in which the particular sewing data corresponding to the referred sewing information is stored.

Embodiment 3: One or more embodiments of the present invention proposes the sewing data processing system, wherein the sewing information includes a command information related to a process of the particular sewing data stored in the storage unit after the sewing is executed based on the particular sewing data corresponding to the referred sewing information, and the sewing machine includes a command information execution unit for executing the command information.

Embodiment 4: One or more embodiments of the present invention proposes the sewing data processing system, wherein the command information is a first information for deleting the particular sewing data, a second information for duplicating the particular sewing data, or a third information for transferring the particular sewing data to a third folder which is different from the second folder in the storage unit.

Embodiment 5: One or more embodiments of the present invention proposes the sewing data processing system, wherein the sewing information includes a time information related to a time when the particular sewing data corresponding to the referred sewing information is stored or an order information related to an order of the stored time, and the sewing data acquisition unit of the sewing machine acquires the particular sewing data based on the time information or the order information.

Embodiment 6: One or more embodiments of the present invention proposes a terminal including: a sewing information file preparation unit for preparing a sewing information file which includes a sewing information related to a particular sewing data selected from a plurality of sewing data stored in a first folder of a storage unit, wherein the sewing information includes a command information for processing the particular sewing data stored in the storage unit after the sewing is executed based on the particular sewing data corresponding to the sewing information by a sewing machine connected with the storage unit.

Embodiment 7: One or more embodiments of the present invention proposes a sewing machine including: a sewing data acquisition unit for referring to a sewing information in a sewing information file which includes the sewing information related to a particular sewing data selected from a plurality of sewing data stored in a folder of a storage unit connected with the sewing machine and acquiring the particular sewing data corresponding to the referred sewing information from the storage unit; a sewing execution part for executing a sewing by reading the particular sewing data acquired by the sewing data acquisition unit; and a command information execution unit for processing the particular sewing data stored in the storage unit according to a command information included in the sewing information after the sewing is executed based on the particular sewing data corresponding to the referred sewing information by the sewing execution part.

Embodiment 8: One or more embodiments of the present invention proposes a program for making a computer execute a sewing data processing method in a sewing data processing system, the sewing data processing system including: a terminal for preparing a plurality of sewing data; a storage unit for storing the plurality of sewing data prepared by the terminal; and a sewing machine for executing a sewing by reading the plurality of sewing data stored in the storage unit, wherein a sewing information file preparation unit of the terminal makes the computer execute: a first process processed by a sewing information file preparation unit for preparing a sewing information file which includes a sewing information related to a particular sewing data selected from the plurality of sewing data stored in a first folder of the storage unit; a second process processed by a storage processing unit for storing the prepared sewing information file in a second folder of the storage unit; and a third process processed by a sewing data acquisition unit of the sewing machine for referring to the sewing information included in the sewing information file based on an operation mode and acquiring the particular sewing data corresponding to the referred sewing information from the storage unit.

Embodiment 9: One or more embodiments of the present invention proposes a program for making a computer execute a sewing data processing method in a terminal, the terminal including: a sewing information file preparation unit; and a command information execution unit, wherein the sewing information file preparation unit prepares a sewing information file which includes a sewing information related to a particular sewing data selected from a plurality of sewing data stored in a folder of a storage unit; and the sewing information includes a command information for processing the particular sewing data stored in the storage unit after the sewing is executed based on the particular sewing data corresponding to the referred sewing information by a sewing machine connected with the storage unit.

Embodiment 10: One or more embodiments of the present invention proposes a program for making a computer execute a sewing data processing method in a sewing machine, the sewing machine including: a sewing data acquisition unit; a sewing execution part; and a command information execution unit, wherein the program makes the computer execute: a first process processed by the sewing data acquisition unit for referring to a sewing information based on an operation mode in a sewing information file which includes the sewing information related to a particular sewing data selected from a plurality of sewing data and acquiring the particular sewing data corresponding to the referred sewing information from a storage unit; a second process executed by the sewing execution part for executing a sewing by reading the particular sewing data acquired by the particular sewing data acquisition unit; and a third process executed by the command information execution unit for processing the particular sewing data stored in the storage unit according to a command information included in the sewing information after the sewing is executed by the sewing execution part.

One or more embodiments of the present invention has an effect of enabling the user to easily obtain a desired embroidery data from the hierarchized folders. In addition, unnecessary embroidery data can be automatically deleted.

BRIEF DESCRIPTION OF THE DRAWINGS

FIG. 6 is a drawing showing an example of an information file prepared in the terminal concerning an embodiment of the present invention.

DETAILED DESCRIPTION OF THE INVENTION

Embodiments

Hereafter, the embodiments of the present invention will be explained with reference to FIG. 1 to FIG. 11.

<Configuration of Sewing Data Processing System>

A sewing data processing system 10 of the present embodiment will be explained by using FIG. 1.

Figure 1:
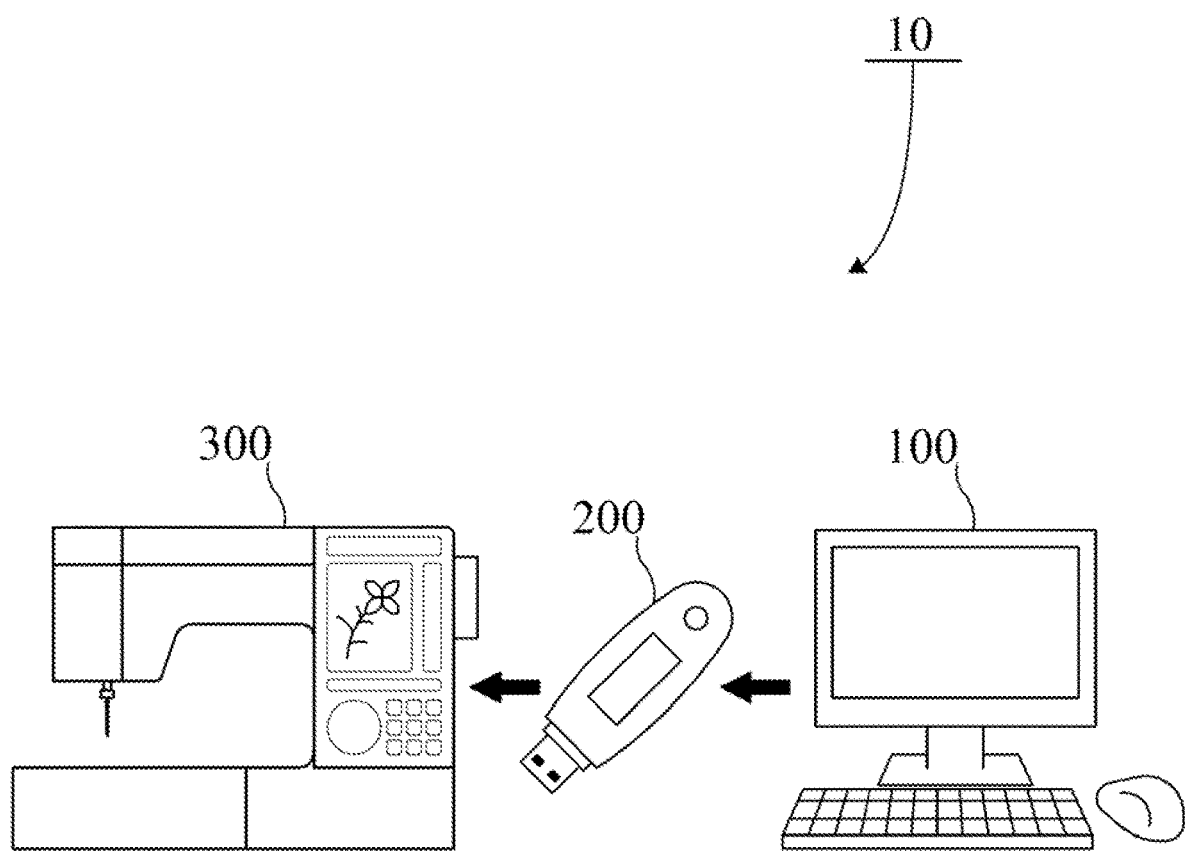
FIG. 1 is a drawing showing a configuration of a sewing data processing system concerning an embodiment of the present invention.

As shown in FIG. 1, the sewing data processing system 10 of the present embodiment is configured by including a terminal 100, a storage unit 200 and a sewing machine 300.

Here, a personal computer, a tablet terminal or the like can be listed as an example of the terminal 100.

In addition, flash drives such as a USB memory stick and an SD card can be listed as the storage unit 200. However, the terminal 100 and the storage unit 200 are not limited to the examples listed above.

The sewing data processing system 10 of the present embodiment relates to, for example, a system for storing the embroidery data prepared by using the terminal 100 in the storage unit 200 and providing the stored embroidery data on the sewing machine 300 for enabling the user to easily select the embroidery data provided on the sewing machine 300 and enabling the sewing machine 300 to quickly shift to an operable state of the sewing. Alternatively, the sewing data processing system 10 of the present embodiment relates to, for example, a system for automatically deleting the embroidery data or automatically transferring the embroidery data to a predetermined place by the sewing machine 300 after the work of the embroidery or the like is finished.

Hereafter, the sewing data processing system 10 of the present embodiment will be explained in detail while showing concrete examples.

<Electrical Configuration of Terminal>

Figure 2:
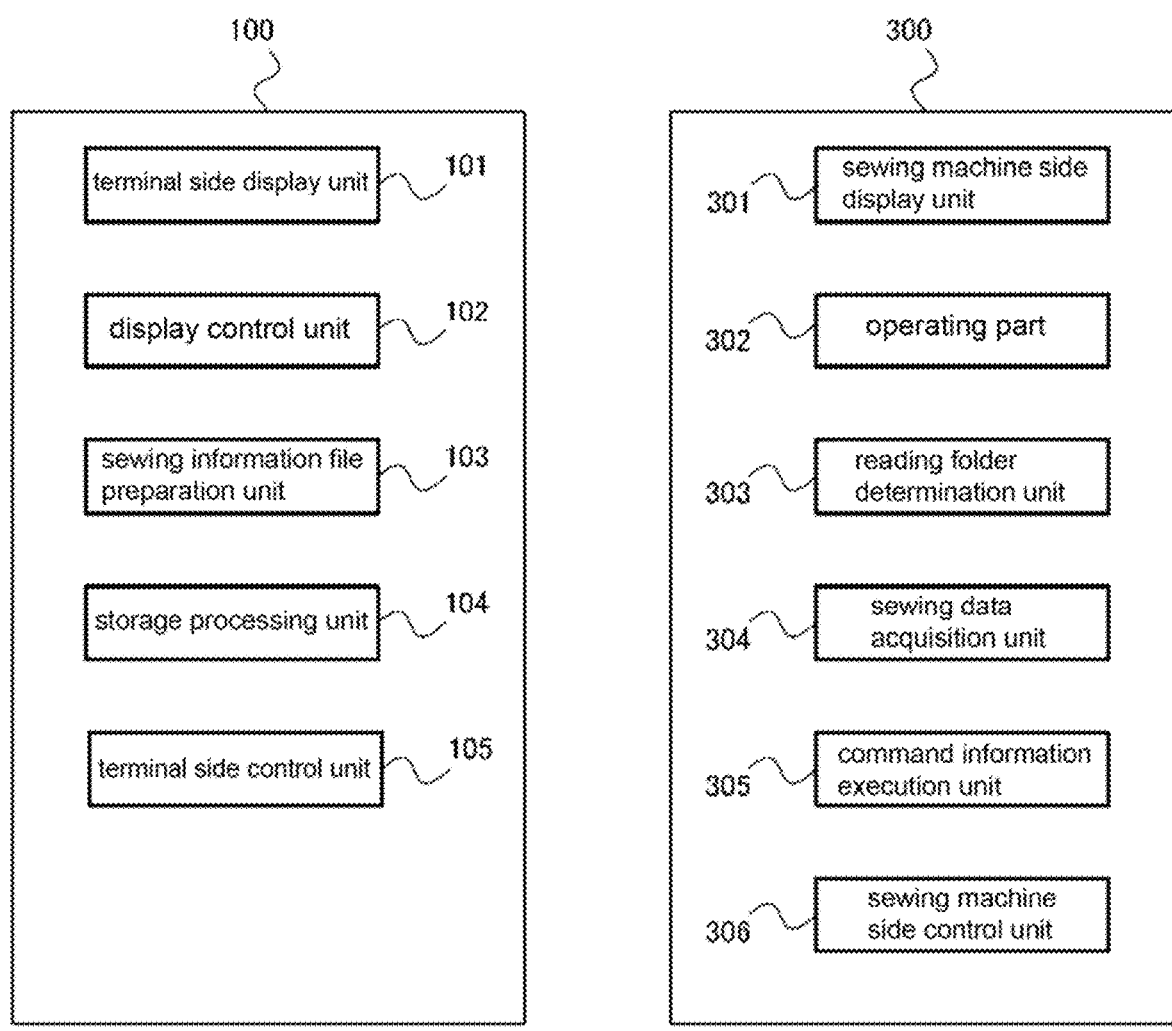
FIG. 2 is a drawing showing an electrical configuration of the sewing data processing system concerning an embodiment of the present invention.

As shown in FIG. 2, the terminal 100 of the present embodiment is configured by including a terminal side display unit 101, a display control unit 102, a sewing information file preparation unit 103, a storage processing unit 104 and a terminal side control unit 105.

The terminal side display unit 101 is a display device for displaying various information and is formed by a liquid crystal panel.

In the present embodiment, the terminal side display unit 101 displays an embroidery data, a stitch data and a monogram data, for example.

The user performs editing operations on the displayed data for adjusting the position, size, rotation angle or the like of embroidery patterns by using a mouse, a pen, a touch panel or the like.

In addition, the terminal side display unit 101 displays, for example, a processing screen for writing the edited pattern data in the storage unit 200, a command selection screen for specifying the command and a folder tree of the storage unit 200 which is connected with the terminal 100 via a wireless or wired network or without using the network.

The display control unit 102 controls the display of the terminal side display unit 101.

Specifically, the display control unit 102 controls the display processing for shifting the screens of the terminal 100 according to the operation of the user. In addition, the display control unit 102 controls to display, for example, an editing menu and an embroidery data to be edited in a predetermined display area.

The sewing information file preparation unit 103 creates (prepares) a sewing information file including a sewing information related to the selected sewing data (particular sewing data) selected from a plurality of sewing data stored in a predetermined folder (first folder) of the storage unit 200 which is connected with the terminal 100 via a wireless or wired network or without using the network.

Note that the sewing information can include a path information of the predetermined folder (first folder) in which the sewing data (particular sewing data) corresponding to the sewing information to be sewn is stored.

In addition, the sewing information can include a command information related to a process of the sewing data after the sewing is executed.

Furthermore, the sewing information can include a time information related to a time when the sewing data corresponding to the sewing information is stored in the predetermined folder (first folder) or an order information related to an order of the stored time.

In addition, the command information can be the information for deleting the sewing data, the information for duplicating the sewing data, or the information for transferring the sewing data to another folder (third folder) which is different from the predetermined folder (first folder) in which the sewing data is stored.

The storage processing unit 104 stores the sewing information file prepared by the sewing information file preparation unit 103 in another folder (second folder) which is different from the predetermined folder (first folder) of the storage unit 200.

The terminal side control unit 105 controls the processing of the whole terminal 100 according to a control program stored in a ROM or the like.

In the present embodiment, for example, the terminal side control unit 105 controls the operations of the display control unit 102, the sewing information file preparation unit 103, the storage processing unit 104 and the like. In addition, according to the operations on the terminal 100 for managing files, the terminal side control unit 105 executes the operations of creating the first, second and third folders on an arbitrary hierarchy of the storage unit 200, storing the embroidery data and the stitch data, which are the particular sewing data, in the first or third folder, additionally writing an absolute pathname and a file name of the first or third folder in which the sewing information file is stored, and closing the sewing information file, for example.

<Electrical Configuration of Sewing Machine>

As shown in FIG. 2, the sewing machine 300 of the present embodiment is configured by including a sewing machine side display unit 301, an operating part 302, a reading folder determination unit 303, a sewing data acquisition unit 304, a command information execution unit 305 and a sewing machine side control unit 306.

The sewing machine side display unit 301 is a display device for displaying various information and is formed by a liquid crystal panel. In the present embodiment, the sewing machine side display unit 301 displays execution screens of the embroidery sewing or the normal sewing, for example.

The operating part 302 is formed by a mouse, a pen, a touch panel or the like to receive the user operations according to the mouse operation and touch operation of the user.

The reading folder determination unit 303 determines the predetermined folder (first folder) from which the sewing information file to be sewn is read out from the storage unit 200 based on the current operation mode (normal sewing mode or embroidery sewing mode) of the sewing machine 300.

The sewing data acquisition unit 304 refers to the sewing information included in the sewing information file from the predetermined folder (first folder) determined by the reading folder determination unit 303 and acquires the sewing data corresponding to the referred sewing information.

Specifically, the sewing data acquisition unit 304 refers to the latest file by referring to the timestamps or the number of file names of the information file stored in the predetermined folder, opens the corresponding information file, and acquires an absolute pathname and a file name of the registered data. Then, the data having the specified file name is read out.

Instead of determining the folder by the reading folder determination unit 303 based on the operation mode, it is also possible to create the sewing information file in a predetermined folder (first folder) regardless of the operation mode. In such a case, the sewing data acquisition unit 304 refers to the sewing information stored in the sewing information file based on the operation mode and acquires the sewing data corresponding to the referred sewing information from the storage unit.

For example, the sewing information files including the sewing information for the normal sewing mode and the embroidery sewing mode are stored in one folder, and the sewing data acquisition unit 304 refers to the file names (sewing information) of the sewing data based on the file extension (e.g., ".STX", ".JEF") corresponding to the operation mode (normal sewing mode, embroidery sewing mode) and acquires the sewing data corresponding to the sewing information obtained by referring to the sewing information.

The command information execution unit 305 executes the command information when the command information related to the process of the sewing data after the sewing is executed is included in the sewing information.

The command information is specified by the command, for example. The contents of the command can be the order for deleting the sewing data, the order for duplicating the sewing data, and the order for transferring the sewing data to another folder which is different from the folder in which the sewing data is stored, for example.

The sewing machine side control unit 306 controls the processing of the whole sewing machine 300 according to a control program stored in a ROM.

In the present embodiment, for example, the sewing machine side control unit 306 controls the operations of the sewing machine side display unit 301, the operating part 302, the reading folder determination unit 303, the sewing data acquisition unit 304, the command information execution unit 305 and the like. In addition, the sewing machine side control unit 306 controls to reload a file allocation table (FAT) of the storage unit 200 into the sewing machine 300, for example.

<Process of Sewing Data Processing System>

A process of the sewing data processing system 10 of the present embodiment will be explained by using FIG. 3 to FIG. 11.

In the following explanation, the process of the terminal 100 and the process of the sewing machine 300 will be separately explained.

<Process of Terminal>

The process of the terminal 100 of the present embodiment will be explained by using FIG. 3 to FIG. 8.

Figure 3:
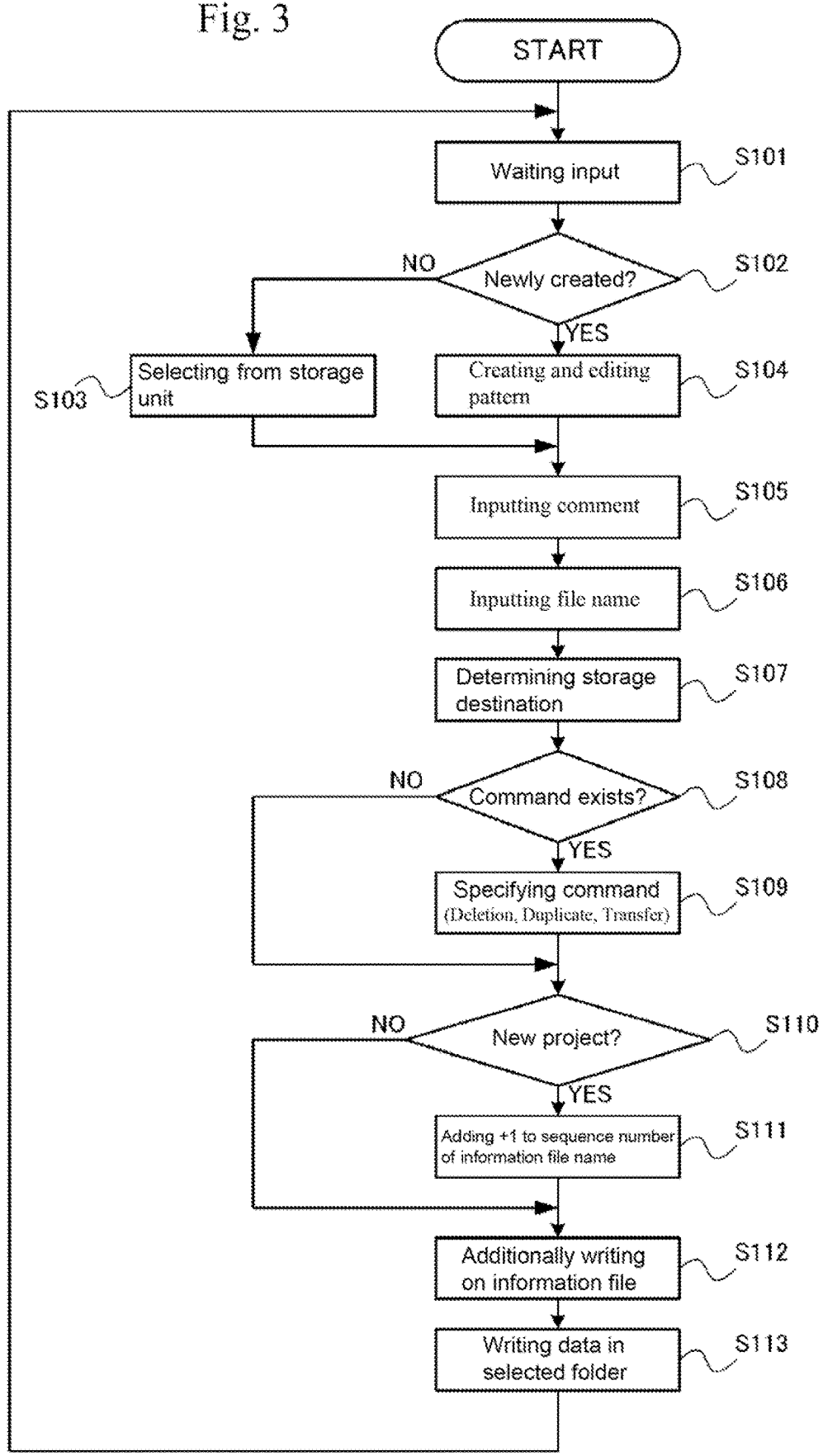
FIG. 3 is a drawing showing a processing flow in a terminal concerning an embodiment of the present invention.

As shown in FIG. 3, at first, the terminal 100 requires the user to input a selection whether the user creates a new embroidery data or uses the embroidery data which has already been stored in the storage unit 200 (Step S101).

Based on the user input of Step S101, the sewing information file preparation unit 103 determines to newly create the embroidery data or use the embroidery data which has already been stored in the storage unit 200 (Step S102).

In Step S102, when the sewing information file preparation unit 103 judges that the user has an intention to use the embroidery data which has already been stored in the storage unit 200 ("No" in Step S102), the sewing information file preparation unit 103 reads the embroidery data requested by the user from the storage unit 200 (Step S103). Then, the process shifts to Step S105.

On the other hand, when the sewing information file preparation unit 103 judges that the user has an intention to newly create the embroidery data ("Yes" in Step S102), the process shifts to Step S104.

Figure 4:
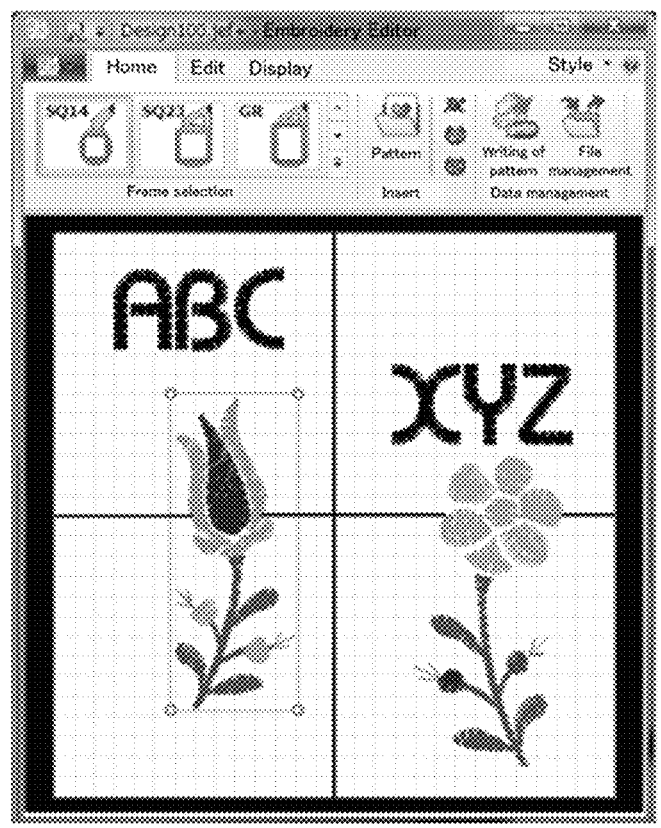
FIG. 4 is a drawing showing an example of an editing screen in the terminal concerning an embodiment of the present invention.

In Step S104, in the screen shown in FIG. 4, a new embroidery data is created by inputting one-point patterns and strings and specifying the arrangement, rotation angle and size, for example.

On the "Home" tab of a tool bar shown in FIG. 4, the buttons for selecting a frame type such as "SQ14", "SQ23" and "GR" are arranged. By selecting these buttons, the maximum area for editing the embroidery data can be determined.

When the "Pattern" button is clicked, a file list screen for selecting the one-point patterns is displayed.

When the "ABC" button is clicked, strings can be inputted and character styles can be selected.

When the "Writing of pattern" button is clicked, a folder selection screen for writing the pattern in the storage unit 200 is displayed.

When the "File management" button is clicked, the user can manage the files. For example, the patterns stored in the storage unit 200 can be transferred, deleted and renamed.

Figure 5:
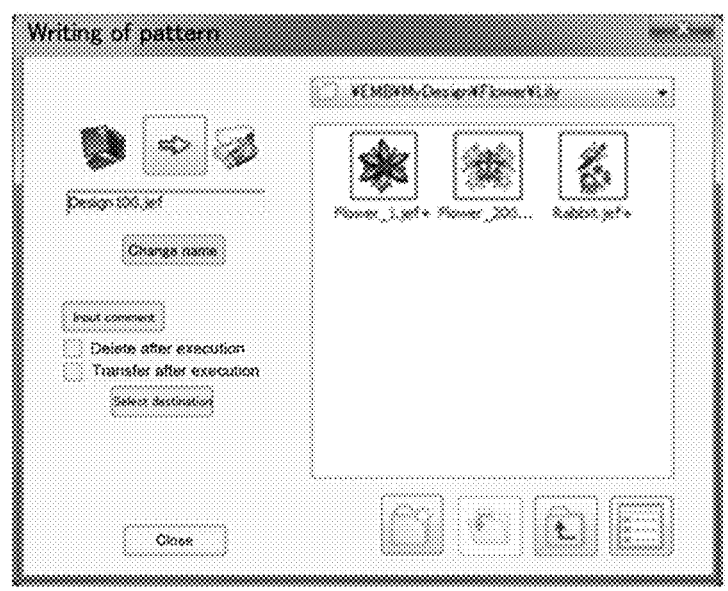
FIG. 5 is a drawing showing an example of a processing screen for writing the pattern data in a storage unit in the terminal concerning an embodiment of the present invention.

In Step S105, a comment described in the information file is inputted by using a screen interface such as a dialog of "Writing of pattern" shown in FIG. 5.

In Step S106, a file name is inputted.

Figure 8:
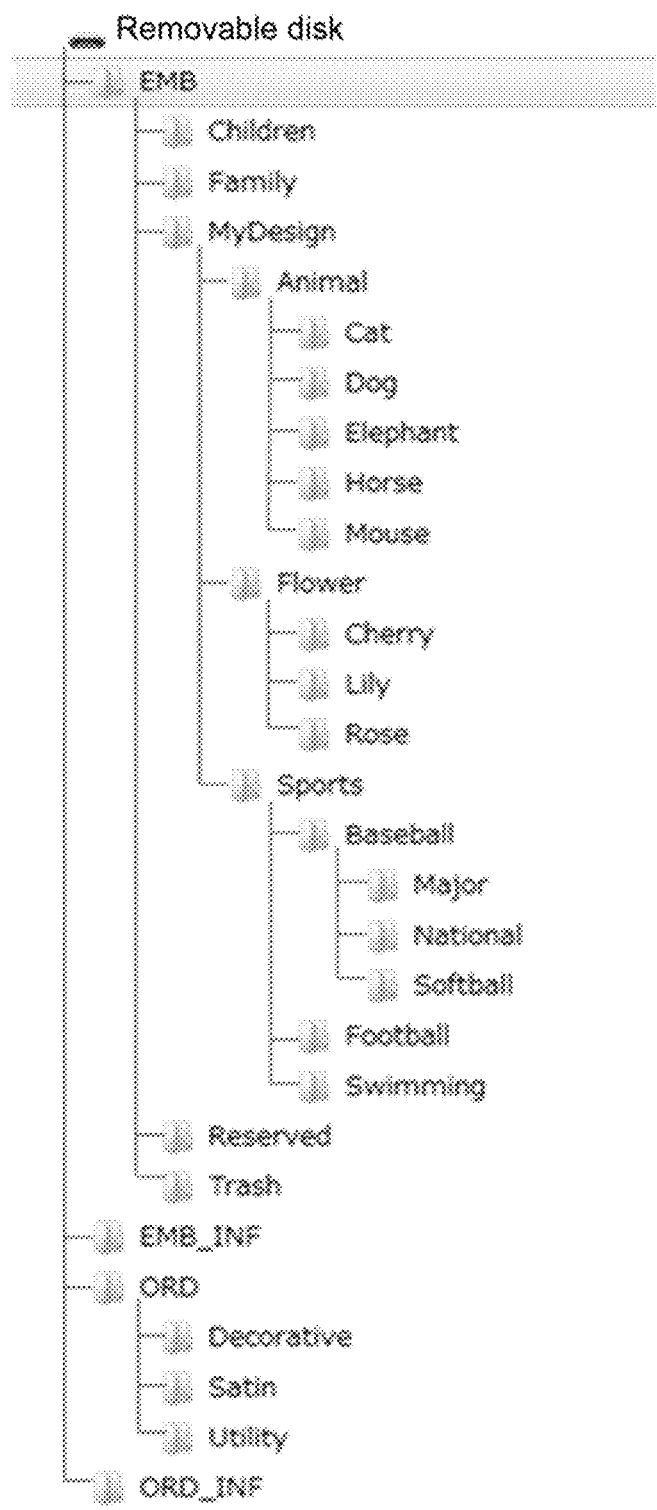
FIG. 8 is a drawing showing a folder tree of the storage unit displayed on a terminal side display unit of the terminal concerning an embodiment of the present invention.

In Step S107, when the down arrow button is pressed in the list box shown in FIG. 5, a folder tree shown in FIG. 8 is displayed, and the user determines a storage destination by selecting a folder to which the data is written.

Note that FIG. 5 shows a case of selecting the storage destination of ¥EMB¥MyDesign¥Flower¥Lily.

If needed, when the "Change name" button is pressed, a new name can be specified.

When the right arrow button is pressed, the pattern displayed on an editing screen is written as a name of Design100.jef in the selected folder of the storage unit 200.

The sewing information file preparation unit 103 judges whether or not the command exists (Step S108). In Step S108, when the sewing information file preparation unit 103 judges that the command does not exist ("No" in Step S108), the process shifts to Step S110. Specifically, when the check marks of the commands of "Delete after execution" and "Transfer after execution" are not selected in the dialog box shown in FIG. 5, the process shifts to Step S110.

On the other hand, when the sewing information file preparation unit 103 judges that the command exists ("Yes" in Step S108), the command of "Delete after execution" or "Transfer after execution" is prepared. Specifically, when the check mark of "Delete after execution" or "Transfer after execution" is selected in the dialog box shown in FIG. 5, the command of "Delete after execution" or "Transfer after execution" is prepared.

The sewing information file preparation unit 103 judges to newly create a new project or to add the information to the project which has already been stored (Step S110). When the sewing information file preparation unit 103 determines to add the information to the project which has already been stored ("No" in Step S110), the process shifts to Step S112.

When the sewing information file preparation unit 103 determines to create a new project ("Yes" in Step S110), the file name is changed by increasing the sequential number of the information file and the information is added after the content is once cleared (Step S111).

At that time, the file name of the information file is numbered by adding "+1." For example, the information file is newly created as INF0012.xml.

The sewing information file preparation unit 103 additionally writes the strings of the comment, the file name, the storage destination and the command (including a transmission destination) in the information file in XML format (Step S112).

Furthermore, the storage processing unit 104 writes the embroidery data in the selected storage destination (Step S113).

When the same location is selected as the storage destination in the storage unit 200, the writing of the embroidery data is not executed.

As shown in FIG. 6, the information file is written in XML (Extensible Markup Language) format. The content of the instruction is indicated by the tag enclosed by "< >".

In FIG. 6, the tag <?xml version="1.0" encoding="Shift-Jis"?> indicates the version of xml and the type of the character code.

The tags <embroidery>---</embroidery> indicate that the data is the embroidery data.

The information of one embroidery pattern is described in the area enclosed by the tags <design>---</design>.

The explanation of the pattern is described in the tags <note>---</note>. The strings of the explanation of the pattern can be displayed on the sewing machine 300.

The full path name of the folder in which the pattern is registered is described in the tags <path>---</path>.

The file name of the pattern is described in the tags <name>---</name>.

The tags <command>---</command> are described when the process after executing the embroidery is required. The deletion of the file of the embroidery data and the transmission of the folder can be instructed by the tags <command>---</command>.

The example of FIG. 6 indicates that the comment of "Flower and text" is added to the first pattern, the folder is located at ¥EMB¥MyDesign¥Flower¥Lily, and the first pattern is stored as the file name of Design100.jef.

Since the description of the command does not exist, the embroidery data remains in the same folder even after the embroidery is finished.

Figure 7:
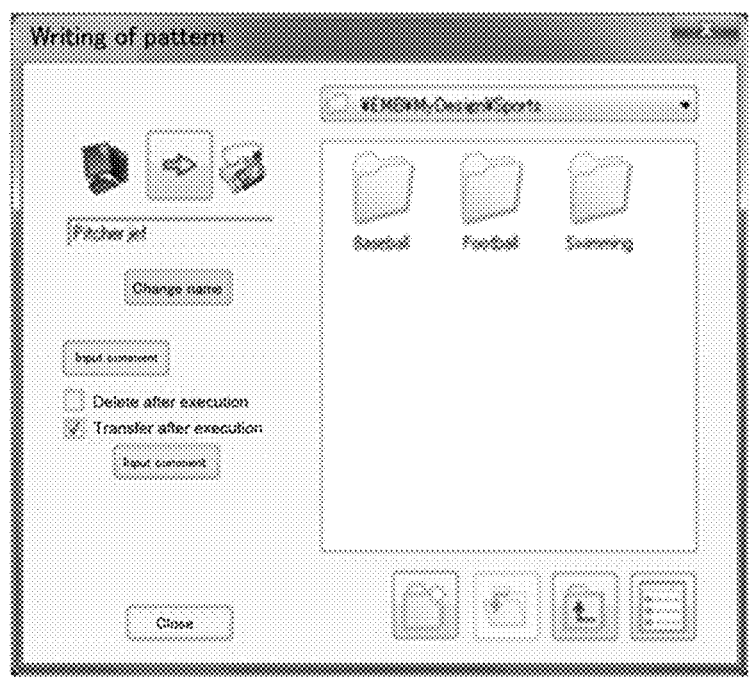
FIG. 7 is a drawing showing an example of a processing screen for writing the pattern data in a storage unit and specifying a command in the terminal concerning an embodiment of the present invention.

The example of FIG. 7 indicates that the folder of \EMB\MyDesign\Sports in the storage unit 200 is selected and the file name is renamed as Pitcher.jef. Furthermore, the folder is instructed to be transferred after the embroidery is finished.

In the information file, the transfer is indicated by <instruction>TRANSFER</instruction> between the tags <command>---</command>, and the designation folder of the pattern data is specified by the tags <option>\EMB\Reserved</option>.

In the example of FIG. 6, the embroidery data is reserved after the embroidery is finished.

As the pattern newly registered on the information file, in addition to the newly created pattern, the embroidery data which already exists in the storage unit 200 can be also selected and specified.

In addition, the commands of "Delete after execution" and "Transfer after execution" cannot be simultaneously checked.

<Process of Sewing Machine>

The process of the sewing machine 300 of the present embodiment will be explained by using FIG. 9 to FIG. 11.

Figure 9:
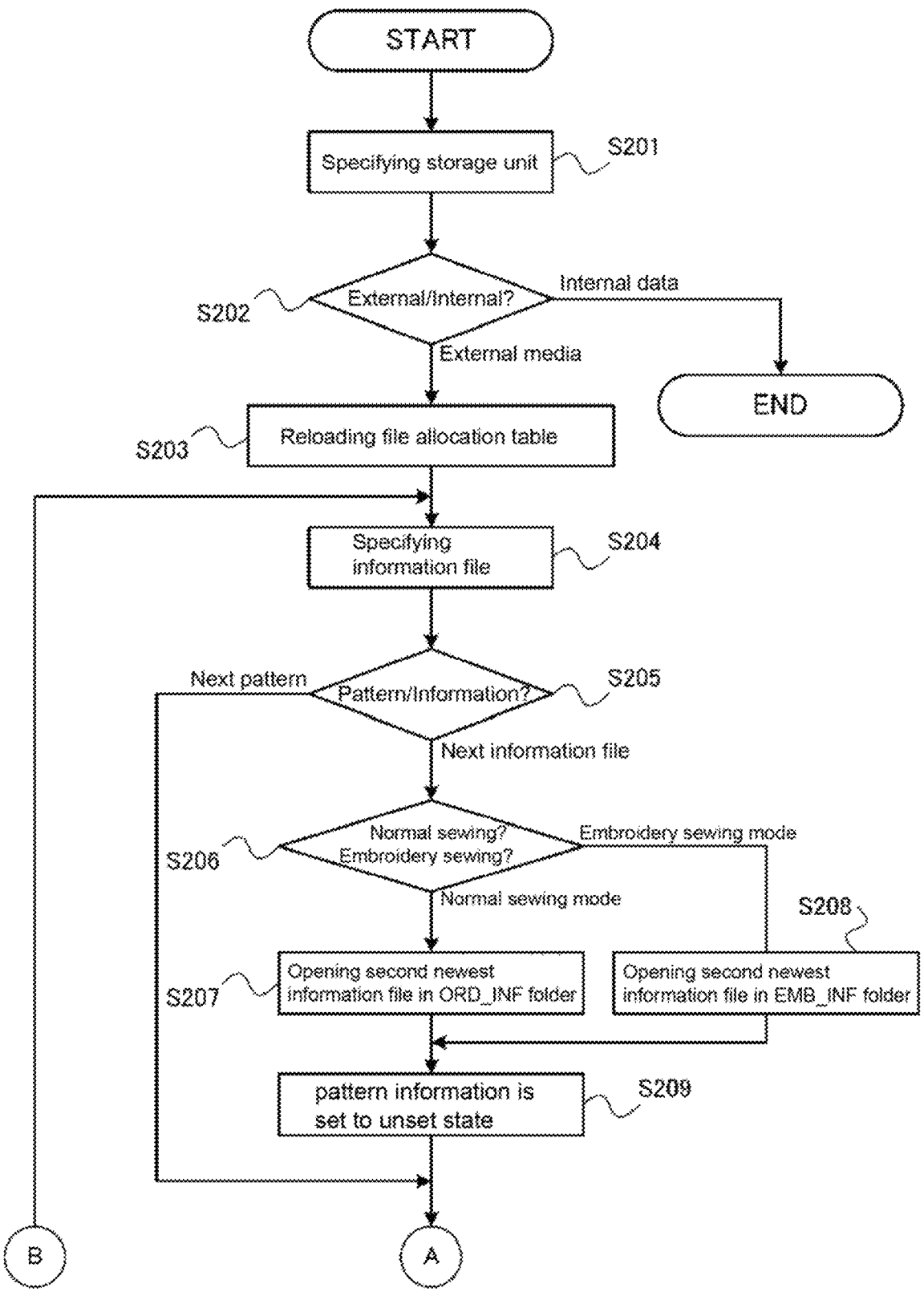
FIG. 9 is a drawing showing a processing flow in a sewing machine concerning an embodiment of the present invention.
Figure 10:
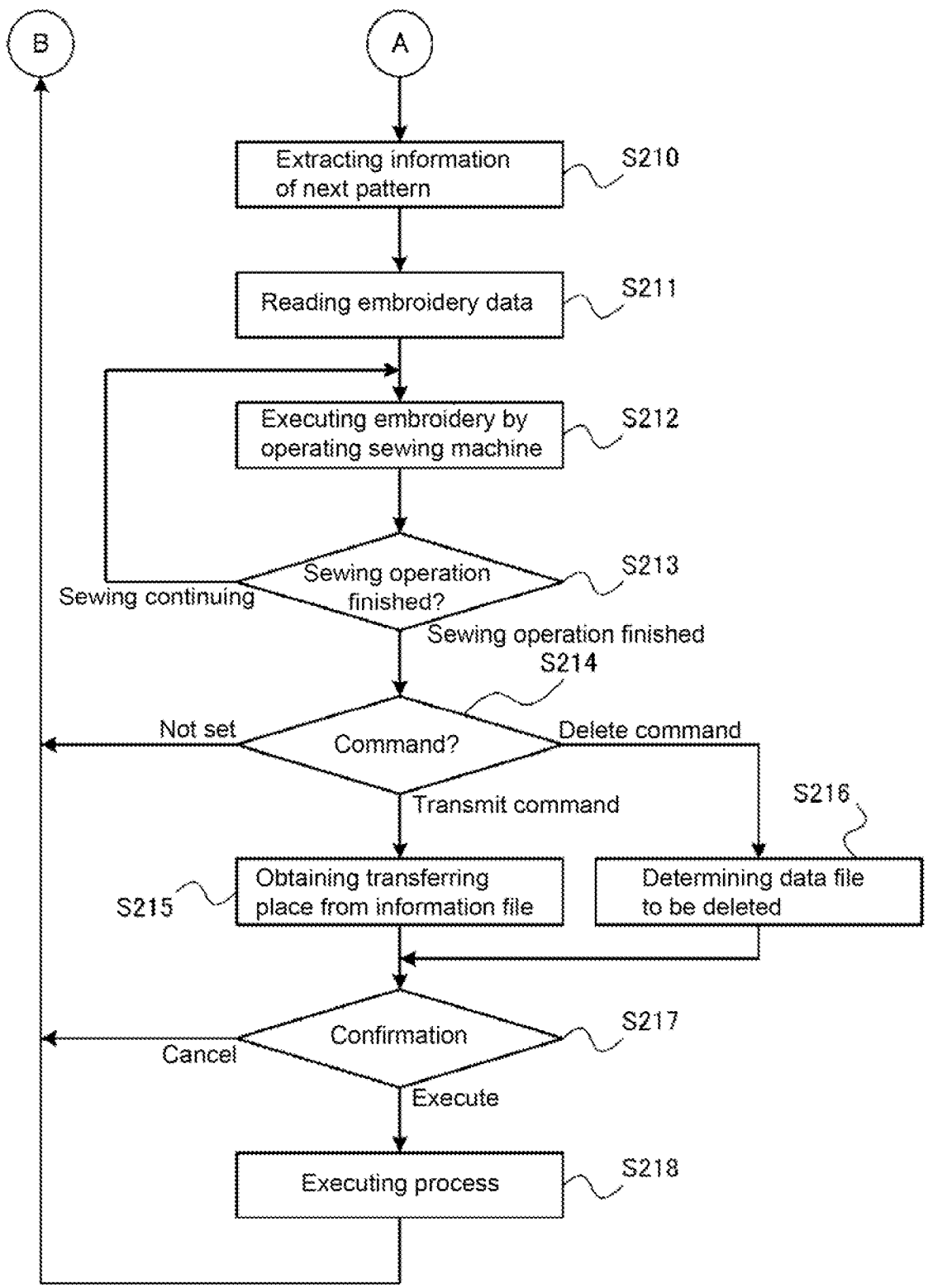
FIG. 10 is a drawing showing a processing flow in the sewing machine concerning an embodiment of the present invention.

As shown in FIG. 9, the user specifies the storage unit 200 from which the embroidery data is read (Step S201).

Figure 11:
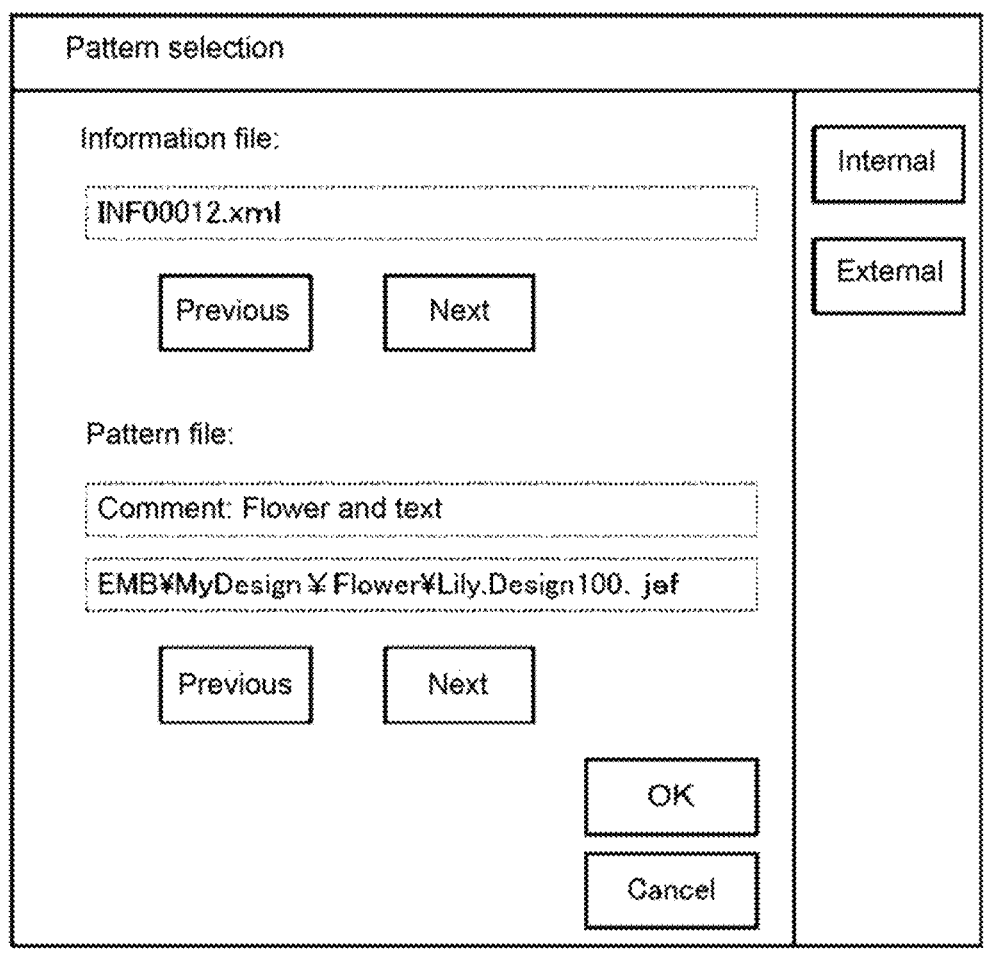
FIG. 11 is a drawing showing an example of a pattern selection screen displayed on a sewing machine side display unit of the sewing machine concerning an embodiment of the present invention.

Specifically, the pattern selection screen shown in FIG. 11 is displayed on the sewing machine side display unit 301. The user selects the desired pattern data while viewing the pattern selection screen.

In the pattern selection screen shown in FIG. 11, "Internal" button and "External" button are displayed on the upper right of the screen. By touching these buttons, the user specifies (switches) the storage unit 200 from which the embroidery data is read.

Corresponding to the above described operation, the name of the information file and the name of the pattern file are displayed on the left side of the pattern selection screen shown in FIG. 11. In addition, the comment of the pattern and the storage location of the pattern file are displayed about the pattern file.

The "Previous" button and "Next" button are displayed below the areas of displaying the information file and displayed below the name of the pattern file. The user can refer to the information file and the pattern file stored in the selected storage unit 200 by touching these buttons.

When the user can find the information file and the pattern file by referring to them, the selection can be determined by touching "OK" button displayed on the lower right of the pattern selection screen.

When "OK" button is mistakenly touched, the determination of the selection can be canceled by touching "Cancel" button.

The sewing machine side control unit 306 judges whether the storage unit 200 selected by the user is the internal storage unit 200 or the external storage unit 200 (Step S202).

When the sewing machine side control unit 306 determines that the storage unit 200 selected by the user is the internal storage unit 200 in Step S201, the process is finished.

On the other hand, when the sewing machine side control unit 306 determines that the storage unit 200 selected by the user is the external storage unit 200 in Step S201, a file allocation table (FAT) of the storage unit 200 is reloaded so that the information stored in the storage unit 200 and the information stored in the sewing machine 300 are matched (Step S203).

After that, file management is performed based on the information of the file system stored in the system of the sewing machine 300.

The reading folder determination unit 303 waits for the instruction of the user for specifying the information file (Step S204).

When the reading folder determination unit 303 receives the instruction for selecting a particular information file from the user, the reading folder determination unit 303 judges whether or not the particular information file selected by the user is the information file registered in the storage unit 200 (Step S205).

When the reading folder determination unit 303 judges that the particular information file selected by the user is the information file stored in the storage unit 200, the process shifts to Step S210 for processing the next pattern.

On the other hand, when the reading folder determination unit 303 determines that the information file is not the information file stored in the storage unit 200, the current sewing mode of the sewing machine 300 is judged (Step S206).

When the reading folder determination unit 303 determines that the current sewing mode of the sewing machine 300 is the embroidery sewing mode, an information file stored in the EMB_INF folder is created from the sequential number of the file name, the newly created information file is opened (Step S208), and a pattern information is set to an unset state (Step S209).

The pattern information is set to the unset state in Step S209 because the pattern information is extracted in the ascending order in Step S210.

When the reading folder determination unit 303 determines that the current sewing mode of the sewing machine 300 is the normal sewing mode, an information file stored in the ORD_INF folder is opened (Step S207), and a pattern information is set to an unset state (Step S209).

The pattern information is set to the unset state in Step S209 because the pattern information is extracted in the ascending order in Step S210.

In Step S210, the reading folder determination unit 303 extracts the information of the next pattern (Step S210).

The reading folder determination unit 303 reads the embroidery data from the storage unit 200 based on the full path name and the file name written in the information file (Step S211).

When the reading folder determination unit 303 reads the embroidery data from the storage unit 200 in Step S210, the sewing machine side control unit 306 actually executes the embroidery by the operation of the sewing machine operated by the user (Step S212).

The sewing machine side control unit 306 judges whether or not the sewing operation is finished (Step S213).

When the sewing machine side control unit 306 determines that the sewing operation is continuing in Step S213, the process shifts to Step S212.

On the other hand, when the sewing machine side control unit 306 determines that the sewing operation is finished in Step S213, the sewing machine side control unit 306 judges whether or not the command is set in the pattern information of the information file (Step S214).

When the sewing machine side control unit 306 determines that the command is not set in the pattern information of the information file, the process shifts to S204.

When the sewing machine side control unit 306 determines that the command is set in the pattern information of the information file and the command is a delete command, the data file to be deleted is temporarily stored and determined (Step S216) and the process shifts to S217.

When the sewing machine side control unit 306 determines that the command is set in the pattern information of the information file and the command is a transfer command, the place to be transferred is obtained from the information file (Step S215) and the process shifts to S217.

In Step S217, the sewing machine side control unit 306 makes the user confirm whether the data file is deleted or transferred (Step S217), and the process shifts to Step S204 when the user instructs to cancel the operation.

On the other hand, when the user instructs to execute the operation, the process is executed (Step S218) and the process shifts to Step S204.

As explained above, a sewing data processing system 10 includes: a terminal 100 for preparing a plurality of sewing data; a storage unit 200 for storing the plurality of sewing data prepared by the terminal 100; and a sewing machine 300 for executing a sewing by reading the plurality of sewing data stored in the storage unit 200, wherein the terminal 100 includes: a sewing information file preparation unit 103 for preparing a sewing information file which includes a sewing information related to a particular sewing data selected from the plurality of sewing data stored in a predetermined folder (i.e., first folder) of the storage unit 200; and a storage processing unit 104 for storing the prepared sewing information file in a second folder (i.e., the folder different from the first folder) of the storage unit 200, and the sewing machine 300 includes: a reading folder determination unit 303 for determining a folder to which the sewing information file to be sewn is read from the storage unit 200 based on the current operation mode; and a sewing data acquisition unit 304 for referring to the sewing information included in the sewing information file from the determined folder and acquiring a sewing data corresponding to the referred sewing information.

Therefore, the user can easily obtain the desired embroidery data from the hierarchized folders.

Namely, the sewing data can be easily obtained based on the location information of the folder in which the sewing data to be sewn exists from a plurality of folders.

Especially, the above described operation and effect are effective in the sewing machine 300 having a poor user interface which is adopted from the viewpoint of cost.

The sewing information includes the path information of the folder in which the sewing data corresponding to the sewing information to be sewn is stored.

Because of this, the user can easily obtain the embroidery data from the hierarchized folders by referring to the path information of the folder included in the sewing information.

The sewing information also includes the command information related to the process of the sewing data after the sewing is executed. In addition, the sewing machine 300 includes the command information execution unit 305 for executing the command information.

Because of this, the sewing data which has been already sewn can be processed after the sewing is executed. Thus, the data stored in the storage unit 200 can be automatically organized on the sewing machine 300 side so that the user can easily obtain the following sewing data.

The command information is the information for deleting the sewing data, the information for duplicating the sewing data, or the information for transferring the sewing data to another folder which is different from the predetermined folder in which the sewing data is stored.

Because of this, when the command information is the information for deleting the sewing data, the data stored in the storage unit 200 can be automatically organized on the sewing machine 300 side by deleting the sewing data which has already been used, for example.

When the command information is the information for duplicating the sewing data, the process can be automatically executed after the duplicated sewing data is stored in an arbitrary folder so that the sewing data which has already been used is combined with another sewing data to create a new sewing data, for example.

When the command information is the information for transferring the sewing data to another folder which is different from the predetermined folder in which the sewing data is stored, the data stored in the storage unit 200 can be automatically organized on the sewing machine 300 side by transferring the sewing data which has already been used to a dedicated folder for the transferred data.

The sewing information also includes a time information related to a time when the sewing data corresponding to the sewing information is stored in a predetermined folder or an order information related to an order of the stored time. The sewing data acquisition unit 304 of the sewing machine 300 acquires the sewing data based on the time information or the order information.

Because of this, the schedule of the sewing can be arbitrarily specified based on the order and time stored in the storage unit 200. Specifically, when a certain sewing is performed, the data required for the sewing can be sequentially stored in a predetermined folder of the storage unit 200 and the sewing can be performed according to the stored order.

The sewing data processing system 10, the terminal 100 and the sewing machine 300 of the present invention can be achieved by recording the processes of the sewing data processing system 10, the terminal 100 and the sewing machine 300 in a recording medium which can be read by a computer system or a computer, and reading programs recorded in the recording medium by the sewing data processing system 10, the terminal 100 and the sewing machine 300 to execute the programs. Here, the computer system or the computer includes hardware such as an OS (operating system) and a peripheral device.

When the WWW (World Wide Web) system is used, "the computer system or the computer" includes a providing environment (or display environment) of the webpage. The program can be transferred from the computer system or the computer which stores the program in the storage unit or the like to other computer systems or computers via a transmission media or via transmission waves in the transmission media. Here, "the transmission media" for transmitting the program is the media having a function of transmitting information. For example, "the transmission media" is a network (communication network) such as Internet and a communication line (communication wire) such as telephone wire.

It is also possible to achieve only a part of the above described functions by the program. It is also possible to achieve the above described functions by combining the above described program with the programs already stored in the computer system or the computer. Namely, the program can be so-called a difference file (difference program).

Although the embodiments of the present invention are explained above with reference to drawings, the specific configuration is not limited to the above described embodiments. The specification can be changed within a range being not deviated from the subject-matter of the present invention.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A sewing data processing system, comprising:
    a terminal for preparing a plurality of sewing data;
    a storage unit for storing the plurality of sewing data prepared by the terminal; and
    a sewing machine for executing a sewing by reading the plurality of sewing data stored in the storage unit, wherein
    the terminal includes:
        a sewing information file preparation unit for preparing a sewing information file which includes a path information related to a particular sewing data selected from the plurality of sewing data stored in a first folder of the storage unit; and
        a storage processing unit for storing the prepared sewing information file in a second folder of the storage unit,
    the sewing machine includes:
        a sewing data acquisition unit for referring to the path information included in the sewing information file based on an operation mode and acquiring the particular sewing data corresponding to the referred path information from the storage unit,
    the sewing information includes an order information related to an order of a stored time of the particular sewing data, and
    the sewing data acquisition unit of the sewing machine acquires the particular sewing data based on the order information.

2. The sewing data processing system according to claim 1, wherein
    the command information is an information for automatically deleting the particular sewing data after the sewing is executed.

3. The sewing data processing system according to claim 1, wherein
    the command information is an information for automatically duplicating the particular sewing data after the sewing is executed.

4. The sewing data processing system according to claim 1, wherein
    the command information is an information for automatically transferring the particular sewing data to a third folder after the sewing is executed.

5. A non-transitory computer readable medium having stored thereon a program for executing a sewing data processing method in a sewing data processing system, the sewing data processing system comprising:
    a terminal for preparing a plurality of sewing data;
    a storage unit for storing the plurality of sewing data prepared by the terminal; and
    a sewing machine for executing a sewing by reading the plurality of sewing data stored in the storage unit, wherein
    the sewing data processing method further comprises:
        a first process processed by a sewing information file preparation unit for preparing a sewing information file which includes a path information related to a particular sewing data selected from the plurality of sewing data stored in a first folder of the storage unit;
        a second process processed by a storage processing unit for storing the prepared sewing information file in a second folder of the storage unit; and
        a third process processed by a sewing data acquisition unit of the sewing machine for referring to the path information included in the sewing information file based on an operation mode and acquiring the particular sewing data corresponding to the referred path information from the storage unit,
    the sewing information includes an order information related to an order of a stored time of the particular sewing data, and
    the sewing data acquisition unit of the sewing machine acquires the particular sewing data based on the order information.

* * * * *